United States Patent
Albert (10) Patent No.: US 10,421,331 B2
(45) Date of Patent: Sep. 24, 2019

(54) METHOD OF SUPPLYING A HYDRAULIC MOTOR FOR A DRIVE WHEEL WITH HYDRAULIC FLUID, ASSOCIATED CYLINDER-TYPE SUSPENSION SYSTEM AND VEHICLE EQUIPPED THEREWITH

(71) Applicant: Laurent Eugène Albert, Frignicourt (FR)

(72) Inventor: Laurent Eugène Albert, Frignicourt (FR)

(*) Notice: Subject to any disclaimer, the term of this patent is extended or adjusted under 35 U.S.C. 154(b) by 0 days.

(21) Appl. No.: 15/527,600

(22) PCT Filed: Nov. 4, 2015

(86) PCT No.: PCT/EP2015/075753
§ 371 (c)(1),
(2) Date: May 17, 2017

(87) PCT Pub. No.: WO2016/078917
PCT Pub. Date: May 26, 2016

(65) Prior Publication Data
US 2017/0355243 A1 Dec. 14, 2017

(30) Foreign Application Priority Data
Nov. 18, 2014 (FR) ...................................... 14 61147

(51) Int. Cl.
*B60G 17/04* (2006.01)
*B60K 7/00* (2006.01)
(Continued)

(52) U.S. Cl.
CPC ........... *B60G 17/0408* (2013.01); *B60G 3/01* (2013.01); *B60G 7/006* (2013.01);
(Continued)

(58) Field of Classification Search
CPC ............ B60G 17/0408; B60G 17/0521; B60G 17/0272; B60G 7/006; B60G 3/01;
(Continued)

(56) References Cited

U.S. PATENT DOCUMENTS 3,476,354 A * 11/1969 Stubblefield ......... B60G 15/061
251/63
3,567,244 A * 3/1971 Hoffmann et al. .... B60G 15/12
267/64.16
(Continued)

FOREIGN PATENT DOCUMENTS

DE 4131545 A1 4/1993
DE 19834411 A1 2/2000
(Continued)

OTHER PUBLICATIONS

International Search Report (in English and French) and Written Opinion of the International Searching Authority (in French) issued in PCT/EP2015/075753, dated Apr. 5, 2016; ISA/EPO.

*Primary Examiner* — Drew J Brown
(74) *Attorney, Agent, or Firm* — Harness, Dickey & Pierce, P.L.C.

(57) ABSTRACT

The invention proposes a method of supplying with hydraulic fluid a hydraulic motor (2) of a drive wheel supporting a vehicle by means of a cylinder-type suspension system (1). The hydraulic fluid passes through a feed duct (25) extending longitudinally through a cylinder (3) of the cylinder-type suspension system (1). The invention also relates to the use thereof in order to eliminate the need for hoses.

19 Claims, 5 Drawing Sheets

(51) Int. Cl.
*B60G 3/01* (2006.01)
*B60K 17/14* (2006.01)
*B60G 7/00* (2006.01)
*B60G 17/027* (2006.01)
*B60G 17/052* (2006.01)
*B60K 17/30* (2006.01)

(52) U.S. Cl.
CPC ..... *B60G 17/0272* (2013.01); *B60G 17/0521* (2013.01); *B60K 7/0015* (2013.01); *B60K 17/14* (2013.01); *B60G 2202/41* (2013.01); *B60G 2204/423* (2013.01); *B60G 2206/424* (2013.01); *B60G 2206/426* (2013.01); *B60G 2300/08* (2013.01); *B60K 17/30* (2013.01); *B60K 2007/0038* (2013.01); *B60Y 2200/221* (2013.01)

(58) Field of Classification Search
CPC ........ B60G 2206/426; B60G 2206/424; B60G 2300/08; B60G 2204/423; B60G 2202/41; B60K 7/0015; B60K 17/14; B60K 2007/0038; B60K 17/30; B60Y 2200/221
See application file for complete search history.

(56) References Cited

U.S. PATENT DOCUMENTS

| | | | | |
|---|---|---|---|---|
| 4,887,515 | A | * 12/1989 | Tabata | F15B 15/1466 92/80 |
| 5,472,071 | A | * 12/1995 | Zimmermann | B60G 3/01 188/322.19 |
| 5,542,492 | A | * 8/1996 | Kasper | B60G 3/01 180/253 |
| 2010/0109422 | A1 | * 5/2010 | Busley | B60G 3/01 299/39.6 |
| 2012/0241230 | A1 | * 9/2012 | Vidal | B60G 3/01 180/58 |
| 2013/0181415 | A1 | * 7/2013 | Henriksson | F15B 15/16 280/6.157 |
| 2015/0000993 | A1 | * 1/2015 | Vidal | B60K 7/0015 180/254 |
| 2017/0282996 | A1 | * 10/2017 | Murakami | B60G 17/016 |

FOREIGN PATENT DOCUMENTS

| | | |
|---|---|---|
| EP | 0620132 A1 | 10/1994 |
| FR | 2693154 A1 | 1/1994 |
| WO | WO-93/13954 A1 | 7/1993 |

* cited by examiner

FIG.7

METHOD OF SUPPLYING A HYDRAULIC MOTOR FOR A DRIVE WHEEL WITH HYDRAULIC FLUID, ASSOCIATED CYLINDER-TYPE SUSPENSION SYSTEM AND VEHICLE EQUIPPED THEREWITH

INTRODUCTION

The invention pertains to a method of supplying a hydraulic motor for a drive wheel with hydraulic fluid, supporting a vehicle by means of a cylinder-type suspension system. There is also proposed a cylinder-type suspension system implementing this method, as well as a vehicle equipped with such a suspension system.

PRIOR ART

The invention belongs to the field of systems for supplying the hydraulic motor of a drive wheel supporting a vehicle, in the area of the hydraulic motor. The vehicles in question are in particular construction machinery, farming tractors, or other self-propelled farming machines, etc., for which it is difficult or impossible to provide a mechanical transmission between the thermal engine and the wheels. One encounters this situation in particular with vehicles needing to have a large ground clearance, incompatible with the presence of drive shafts connecting the axle of the drive wheels.

In the aforementioned field, the principal motor, generally a thermal one, drives a pump which produces a hydraulic fluid (oil) under pressure to supply the hydraulic motor of each drive wheel. The oil, once having done its work in the hydraulic motor, returns under low pressure to the inlet of the pump. The supplying of the hydraulic motor is done by flexible tubes connected to the motor. The flexible tubes become deformed to accept the displacement of a suspension system of the wheel as well as, in the case of a steering wheel, the angle lock of the wheel. Furthermore, being close to the wheels, and the ground, the flexible tubes are exposed to mechanical aggressions.

The risk of rupture or bursting of the flexible tubes can only be reduced in an uncertain manner by preventive maintenance and possibly premature replacement. The risk of rupture or bursting of the flexible tubes is a major handicap in terms of reliability of a machine so equipped. Moreover, the rupture or bursting of a flexible tube is dreaded because it is accompanied by a major leakage of oil which pollutes the ground, especially farmland, on which these vehicles are moving.

The supplying by flexible tubes requires having a specific location behind the wheel to situate these conduits. Whatever the position of the wheel in relation to the chassis in the course of the movement of the vehicle, the suspension and motorization elements must not interfere spatially with the flexible conduits. This is a constraint in terms of design.

Thus, the supplying by flexible tubes involves a constrained design, a manufacturing cost, a particular maintenance and a risk of breakdown.

One purpose of the invention is to mitigate all or some of the drawbacks of the prior art, and/or to improve the flexibility and simplicity of installation while preserving or improving the robustness and the cost of manufacturing, maintenance, and/or operation of the means by which a hydraulic motor of a drive wheel is supplied with hydraulic fluid.

PRESENTATION OF THE INVENTION

According to a first aspect of the invention, at least one of the aforementioned purposes is achieved with a method of supplying hydraulic fluid to a hydraulic motor of a drive wheel supporting a vehicle by means of a telescopic cylinder-type suspension. According to the invention, the hydraulic fluid is made to pass through a feed duct extending longitudinally through a jack of the cylinder-type suspension system.

The jack is one of several possible types. For example, it might be a jack containing a helical suspension spring, working by compression between the plunger and the bottom of the cylinder formed in the body of the jack. It may be an oil-pneumatic or pneumatic type. It may also be a shock-absorbing jack operating in combination with a suspension spring installed functionally between the wheel support and the chassis, in parallel with the jack.

According to the invention, there is no longer any need for a flexible tube and thus there are no longer any risks of rupture of the flexible tube. The passage of fluid occurs through the jack of the cylinder-type suspension system. This feature dispenses with the need for a specific location behind the wheel for the arrangement of the conduits.

This, the method according to the invention solves the aforementioned objectives.

If the suspension system comprises only a single jack, the latter may be traversed by two conduits in parallel with the axis of the jack, one to supply high-pressure hydraulic fluid and one for the return of the fluid to the pump intake.

However, in an advantageous version of the method, the hydraulic fluid having passed through the motor is made to pass by a return channel extending longitudinally through a second telescopic jack of the cylinder-type suspension system, the cylinder-type suspension system being equipped with two parallel jacks.

According to a second aspect of the invention, there is proposed a cylinder-type suspension system designed to connect in flexible manner a hydraulic motorization wheel to a vehicle chassis, comprising at least one suspension jack having a body and a plunger, constituting two telescopic elements able to be connected one to the chassis and the other to a wheel stator which can be a wheel support and/or a hydraulic motor frame, and channeling means for connecting the hydraulic pump mounted on the chassis and a hydraulic motor associated with the wheel. According to the invention, the channeling means comprise at least one channel extending longitudinally through the jack.

Preferably, the plunger of the jack is fixed to the wheel stator.

Advantageously, the at least one channel comprises a feed duct for supplying the hydraulic motor with hydraulic fluid under pressure and one return channel for the hydraulic fluid driven back by the hydraulic motor and returning to the pump. In the case of certain two-way motors, the supply channel may become the return channel for rear travel, and the return channel then becomes the feed duct.

Preferably, the suspension has two parallel jacks, each one comprising an aforementioned channel, for supply and for return, respectively.

Preferably, the bodies of the two jacks are rigidly joined to each other.

In the case of a steering wheel, the jack body or bodies have only one degree of freedom in rotation with respect to the chassis, about a steering pin axis.

In the case of a steering wheel, the angle of lock of the suspension system may be 90° to the inside and/or outside of the vehicle.

The means for connecting the suspension system to the chassis may be arranged above the jack body or bodies.

In the case of a non-steering wheel, the jack body or bodies are integrated in the chassis.

Advantageously, the channel communicates with a chamber for compensation of length variations of the channel, resulting from variations in length of the jack.

Preferably, the compensation chamber has a cross section equal to that of the channel in a region whose length vanes with the length of the jack, and the compensation chamber has an axial length undergoing variations equal in value and opposite in sign to those of the region of the channel.

According to one particular feature, the compensation chamber is defined between two end walls of this chamber, one of them belonging to a cylinder of the jack and the other to a plunger of the jack, and which move away from each other as the jack is shortened.

In one particular embodiment, the compensation chamber is annular and it is defined between an interior cylindrical wall formed on the periphery of the plunger and an exterior cylindrical wall formed inside the cylinder of the jack, and the channel communicates with the chamber by a substantially radial passage through the plunger.

Advantageously, the communication between the channel and the compensation chamber comprises a constriction which contributes to the shock absorbing of the suspension system.

In one advantageous embodiment, the channel is partly defined in a bore of a jack plunger and partly in an axial cannula which is secured to the body of the jack in a cylinder of the jack. The cannula slides in the bore of the plunger during the displacements of the suspension system. A seal is provided around the cannula in the bore of the plunger.

Preferably, in order to form the constriction, the passage is partly formed by the gap between the cannula and the bore.

In the case of a suspension system for a steering wheel, on the side with the chassis, the channel is preferably connected to a chamber which is concentric with a steering pin.

In one embodiment, there are two chambers, one for the supplying of hydraulic fluid under pressure, the other for the return of hydraulic fluid, one being central, the other being annular about the central chamber.

Preferably, there is also a leak recovery chamber in the steering pin, designed to intercept hydraulic leakage in the steering pin and/or connected to a channel for recovery of hydraulic fluid leakages.

Advantageously, the suspension medium located in the working chamber of the jack between the plunger and a bottom of the cylinder of the jack is not miscible with the hydraulic fluid supplying the hydraulic motor.

In one embodiment, the telescopic elements are adapted to be connected, the one rigidly to the wheel stator, and the other to the chassis with at most one degree of freedom, which is a rotation about a steering pin axis. The jack ensures a linear guidance of the wheel stator with respect to the chassis during displacement movements of the suspension system. Advantageously, the longitudinal axis of the jack meets an equatorial plane of the wheel substantially in the area of the ground on which the wheel is resting.

Advantageously, the suspension medium located in the working chamber between the plunger and the cylinder of the jack is not miscible with the hydraulic fluid supplying the hydraulic motor. One thus avoids the hydraulic fluid of the hydraulic motor mixing with an oil located in the working chamber of the jack. Typically, the medium located in the chamber of the jack is a gas.

Preferably, the suspension system according to the invention can furthermore comprise a spring functionally disposed between a jack body and the frame of the hydraulic motor. When the suspension system comprises two jack bodies, the spring can be functionally disposed between the jack bodies and the frame of the hydraulic motor. This spring can be of mechanical or pneumatic type.

Advantageously, the suspension system according to the invention can furthermore comprise an assembly containing a spring and an attitude adjustment jack, mounted in series, the assembly being functionally disposed between the jack body and the frame of the hydraulic motor. When the suspension system comprises two jack bodies, the assembly can be functionally disposed between the jack bodies and the frame of the hydraulic motor. This spring can be of mechanical or pneumatic type. The attitude adjustment jack may be of hydraulic type.

Advantageously, the vehicle may be equipped with means of regulating the fluid volume of the attitude adjustment jack and the pressurization of the suspension jacks.

Advantageously, a control law, such as one dedicated to controlling the attitude of the vehicle or the stiffness of the suspension systems, determines the fluid volume of the attitude adjustment jack and the pressurization of the suspension jacks.

Regulating means may allow the implementing of the control laws. The regulating means of the fluid volume of the attitude adjustment jack may be a valve. The regulating means for the pressurization of the suspension jacks may be a compressor.

The regulating means may be driven by a control unit. The control unit may be a central unit, of digital computer type.

In one embodiment, the suspension system according to the invention may comprise a shock absorber functionally disposed between the jack bodies and the frame of the hydraulic motor, or more generally the jack plungers. The shock absorber is preferably of hydraulic type.

Preferably, the shock absorber is disposed on the side opposite to the direction of movement of the wheel. By direction of movement of the wheel is meant the forward movement direction. By forward movement direction is meant the principal direction of displacement of the vehicle.

According to a third aspect, the invention concerns an adaptation casting designed to integrate a hydraulic motor with a suspension system according to the second aspect of the invention and to place in respective communication the fluid feed and return ducts of the suspension system with those of the hydraulic motor.

The adaptation casting makes it possible to adapt any given hydraulic motor to the suspension system according to the invention.

For this purpose, the adaptation casting advantageously comprises feed and return ducts to provide respectively the circulation of a pressurized fluid between the feed path of the suspension system according to the invention and a feed orifice for pressurized fluid of the hydraulic motor and the circulation of a nonpressurized fluid between a return orifice for nonpressurized fluid of the hydraulic motor and the return path of the suspension system according to the invention.

For this purpose, the adaptation casting comprises means of securing the hydraulic motor to the adaptation casting.

The adaptation casting furthermore has means of securing the suspension system according to the invention to the adaptation casting.

According to a fourth aspect, the invention concerns a vehicle mounted on wheels with hydraulic motorization, wherein the hydraulic motorization wheels are connected to a chassis of the vehicle by a suspension system according to the second aspect.

More generally and according to a fifth aspect of the invention, selectively combinable with all or part of what has just been stated, the invention proposes a method of feeding hydraulic fluid to a hydraulic motor by means of a telescopic jack. According to this fifth aspect, the jack comprises a body and a plunger constituting two telescopic elements, one of which is secured to a structure and the other is secured directly or indirectly to a stator of the hydraulic motor. The jack constitutes a means of sliding guidance of the stator of the hydraulic motor with respect to the structure along the axis of the jack, and/or a means of exerting a force on the stator of the hydraulic motor with respect to the structure. According to the invention, the hydraulic fluid feeding the hydraulic motor and/or returning from the hydraulic motor is made to pass through a feed duct extending longitudinally through the jack.

According to a sixth aspect of the invention, selectively combinable with all or part of what has just been stated, the invention proposes a jack designed to connect in mobile manner a hydraulic motorization to a structure. According to the invention, the jack has a body and a plunger, constituting two telescopic elements able to be connected, one to the structure and the other to a stator of the hydraulic motor. Channeling means extend between a hydraulic pump mounted on the structure, and the hydraulic motor. According to the invention, the channeling means comprise at least one duct extending longitudinally through the jack.

The fifth and sixth aspect are applicable to the motorization of an element which is in variable position relative to the structure.

DESCRIPTION OF THE FIGURES

Other features and advantages of the invention will appear upon perusal of the detailed description of embodiments and methods of implementation, which are in no way limiting, in view of the appended figures, where.

DESCRIPTION OF THE INVENTION

These embodiments being in no way limiting, one could in particular realize variants of the invention comprising only a selection of features described below, such as are described or generalized, in isolation from other features described, if this selection of features is sufficient to confer a technical advantage or to differentiate the invention with regard to the prior art.

There shall now be described, in reference to FIGS. 1 to 3, a first embodiment of a cylinder-type suspension system 1 according to the invention, outfitting a vehicle of which one can see in FIG. 1 only the wheel W, its motorization, its suspension system, and a portion of the chassis C. The cylinder-type suspension system 1 is designed to connect in flexible manner the wheel W of the hydraulic motorization 2 to the chassis C of the vehicle. The motor 2 comprises a frame B forming the wheel support, a stator 81 secured to the frame B and a rotor 82 designed to be secured to the wheel. The frame B and the stator 81 form what is called a "wheel stator".

Figure 2:
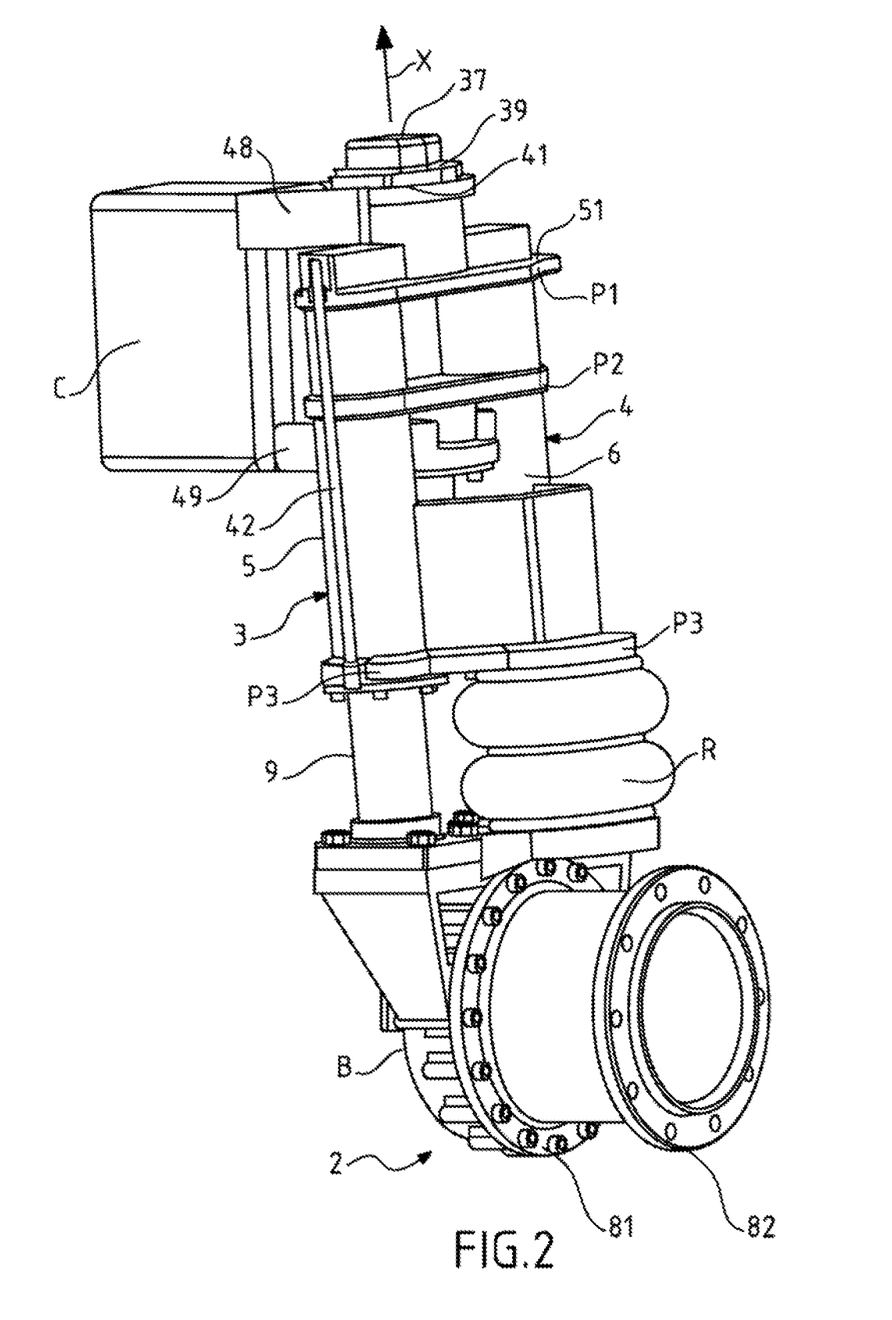
FIG. 2 is a perspective view of a first embodiment of the cylinder-type suspension system in the example of the vehicle of FIG. 1.
Figure 3:
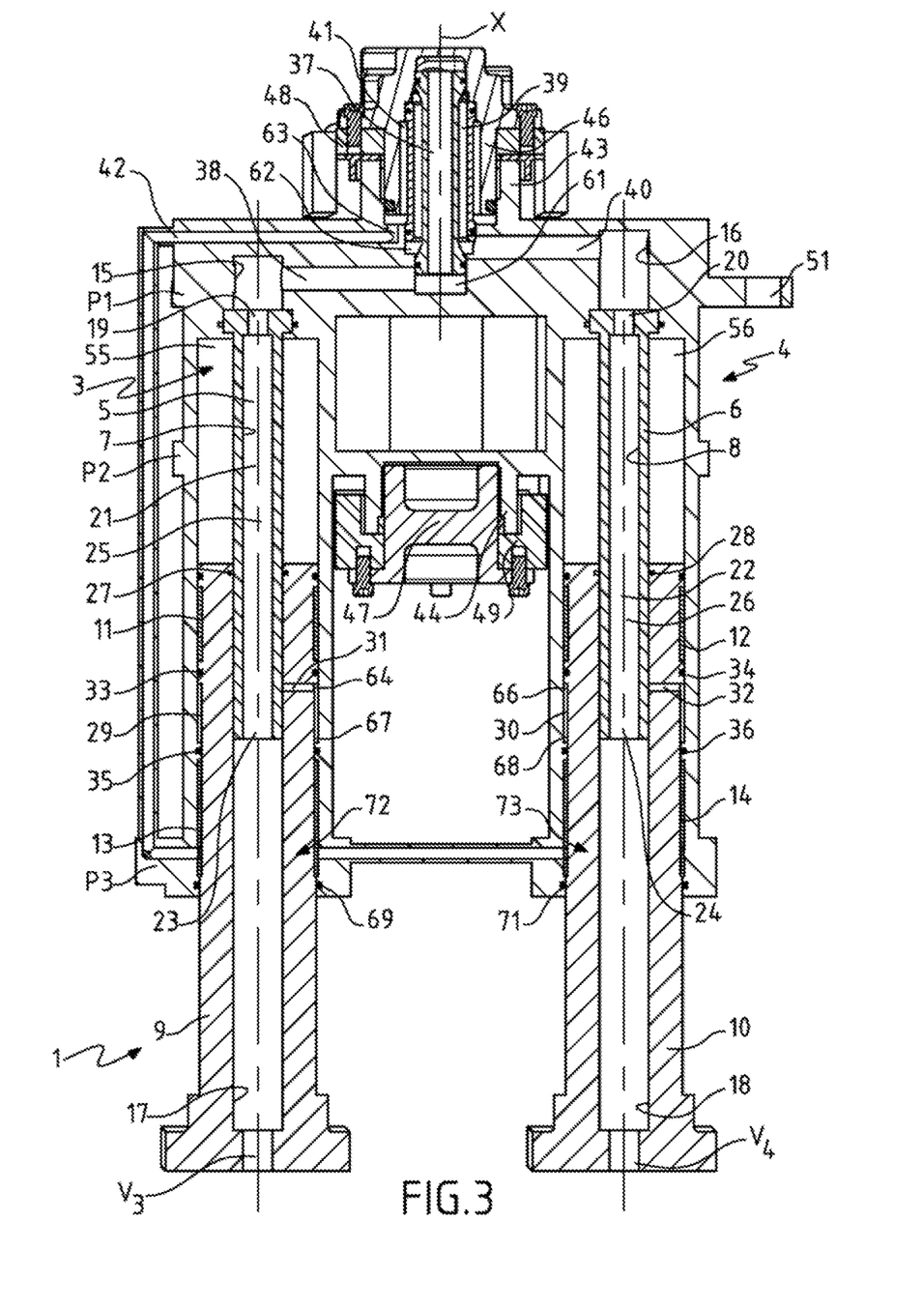
FIG. 3 is a cross-sectional view of the upper portion of the cylinder type suspension system of FIG. 2.

The cylinder-type suspension system 1 comprises two telescopic jacks 3, 4 (FIGS. 2 and 3).

Each of the jacks 3, 4 comprises a body 5, 6 in which a blind cylinder 7, 8 is bored out. A respective plunger 9, 10 is mounted to slide in each cylinder 7, 8. In order to ensure a guidance of the plunger 9, 10 in the cylinder 7, 8, guide bushings 11, 12 line the periphery of the free end of the plungers 9, 10 and guide bushings 13, 14 line the surface of the cylinders 7, 8 in the vicinity of their mouth. In each cylinder 7, 8, a working chamber 55, 56 is delimited between the plunger 9, 10 and the bottom of the cylinder.

The bodies 5, 6 of the telescopic jacks 3, 4 are joined together in rigid manner and in parallel by means of three connecting plates P1, P2, P3.

The jack plungers 9, 10 are secured rigidly to the frame B of the hydraulic motor 2.

A pneumatic spring R is installed functionally between the plate P3, or ore generally the bodies 5, 6 of the jacks, and the frame B of the hydraulic motor 2.

In the example shown, the wheel W is a steering wheel of the vehicle. Accordingly, the suspension system 1 is connected to the chassis C in pivoting fashion about a steering pin axis X making an angle close to 90° with the horizontal. In the example shown, the steering pin axis X intersects the equatorial plane E of the wheel W at a point Q situated on the ground S.

For the pivoting of the suspension system about the steering pin axis X, the plates P1 and P2 are each integrated with a plain bearing 43, 44, of axis X, each one receiving a trunnion 46, 47 integrated with a bracket 48, 49 secured to the chassis C and being a part thereof. The plate P1 comprises a coupling means 51, distant from the steering pin axis X, for the connecting of the plate P1 to a steering control linkage.

Figure 1:
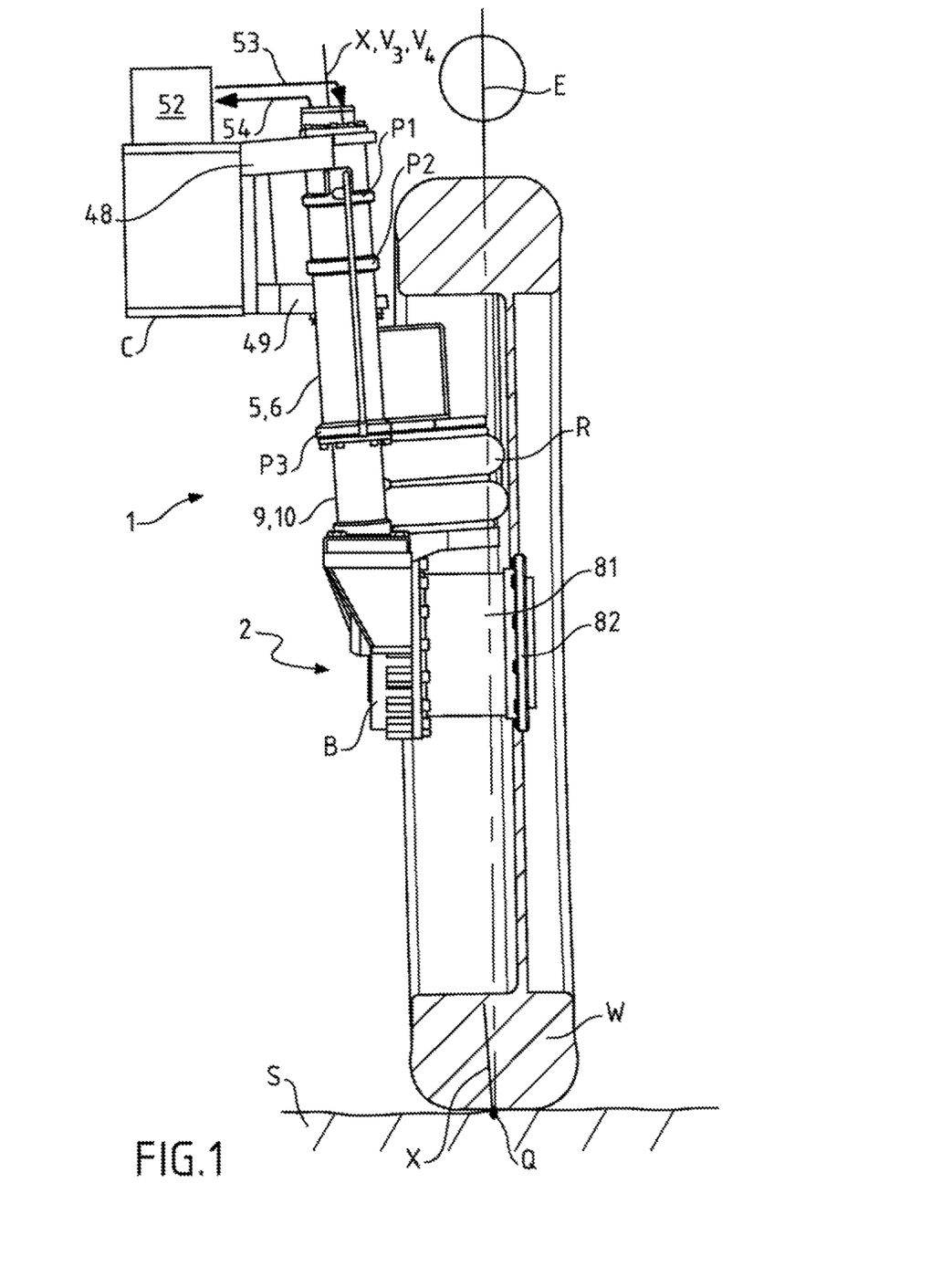
FIG. 1 is a cross-sectional view of the region of a steering wheel of one embodiment of the vehicle according to the invention.

As shown by FIG. 1, the axes V3, V4 of the two jacks 3, 4 meet the equatorial plane E of the wheel W in the area of the ground S. Thus, the substantially vertical forces which are transmitted between the chassis C and the ground S through the suspension system 1 exert no torque on the cylinder/plunger guidance of the jacks. This guidance, which is provided by the bushings 11, 12, 13, 14, only has to withstand substantially horizontal forces and the corresponding torques.

In the example shown, the steering pin axis X is coplanar with the axes V3, V4 of the two jacks 3, 4 and the common plane of these three axes intersects the equatorial plane E of the wheel W along a line situated in the equatorial plane E and in the plane of the ground S. The tracing of this line in the plane of FIG. 1 is the point Q.

The hydraulic motor 2 requires a path for supply of pressurized oil 53 from a pump 52 mounted on the chassis C (as shown very schematically in FIG. 1), and a path for return of oil 54 from the motor 2 to the pump 52.

According to the invention, the paths 53 and 54 pass longitudinally through the jacks 3 and 4.

More particularly, each path comprises a respective axial duct 25, 26 of one of the jacks 3, 4, respectively.

In the example shown, each duct 25, 26 is formed by an axial bore 17, 18 in the plunger 9, 10, and by the conduit of a rectilinear rigid cannula 21, 22 which is secured to the body 5, 6 at the bottom of the cylinder 7, 8, and extends axially in the cylinder 7, 8. A proximal end 19, 20 of the cannula is fitted in rigid and tight manner in a cavity 15, 16 formed in the inner surface of the bottom of the jack body 5, 6.

The other end, or free end 23, 24 of the cannula is engaged in sliding manner in the bore 17, 18 of the plunger. For this purpose, the outer diameter of the cannula corresponds, except for a functional play, to the inner diameter of the bore 17, 18. The play may be relatively large, for example, several tenths of a millimeter, in order to prevent any overguidance between the plunger and the body of the jack. The cannula 21, 22 is long enough to remain engaged in the bore 17, 18 even when the jack is in the maximum extended state.

The cannula 21, 22 slides in tight manner in the bore of the plunger 9, 10 during the displacements of the suspension system 1, in the sense that the gap or annular play between the outer surface of the cannula and the bore of the plunger is closed by a dynamic seal 27, 28. In the example shown, the seal 27, 28 is disposed in the bore 17, 18 of the plunger at its end adjacent to the working chamber 55, 56 of the jack so as to be in tight contact with the periphery of the cannula 21, 22. The seal 27, 28 ensures a tight separation between the hydraulic fluid enabling the operation of the motor 2 on the one hand, and any medium present in the working chamber 55, 56 of the jacks, on the other hand. Preferably, as shown, the seal 27, 28 is very close to the working chamber 55, 56 of the jack, so that the major portion of the length of the gap between the cannula 21, 22 and the bore 17, 18 communicates with the bore 17, 18 and more generally with the duct 25, 26.

In a manner not represented, at their end opposite the working chamber 55, 56 the bores 17, 18 are connected to corresponding feed and return orifices, respectively, formed in the frame B of the hydraulic motor 2, and emerging through the surface of the frame B against which the plungers 9, 10 of the jacks are secured.

Advantageously, said surface is a plane surface in common to the two plungers 9, 10.

On the side opposite the plungers 9, 10, the ducts 25, 26 may be connected rigidly and securely to the feed and return paths 53, 54, respectively, of the chassis C in the case of a non-steering wheel.

On the other hand, in the case illustrated of a steering wheel, the connection of each duct 25, 26 to the corresponding paths 53, 54 is realized by a system of rotary seals installed in the upper steering pin.

In the example shown, two chambers 37, 39 are disposed in the trunnion 46 integrated with the chassis C, being coaxial with the steering pin axis X. These each communicate in tight manner with one of the two chambers 61, 62 formed in the plate P1. These communications are assured regardless of the angular position of the plate P1 with respect to the chassis C about the steering pin axis X. The concentric chambers 37, 39 are in fixed communication with the intake and delivery orifices, respectively, of the pump 52. The chambers 61, 62 are in fixed communication, the one with the cavity 15, the other with the cavity 16, via substantially radial conduits, respectively, 38, 40, formed in the body of the plate P1.

The chamber 37 is an axial chamber, whereas the chamber 39 is an annular chamber surrounding the chamber 37.

In the example represented, a third annular chamber 41 is provided in the trunnion 46, surrounding the annular chamber 39 and communicating with a third chamber 63 formed in the plate P1 in order to be situated in the path taken by the hydraulic fluid in escaping across the plain bearing 43, 44 and coming from the chambers 61 and 62. Thus, the chamber 63 constitutes a leak recovery chamber. The annular chamber 41 is connected for example to a reservoir of hydraulic fluid from which the pump draws automatically as need be.

Each jack 3, 4 comprises a compensation chamber 29, 30 designed to compensate for variations in the volume of hydraulic fluid in the duct 25, 26 when the length of the duct 25, 26 varies as a consequence of the displacements of the suspension system 1.

More precisely, the compensation chamber 29, 30 is annular and defined between an inner cylindrical wall formed on the periphery of the plunger 9, 10 and an outer cylindrical wall formed inside the jack cylinder 7, 8. Moreover, the compensation chamber 29, 30 is defined between a shoulder 64, 66 which broadens the head of the plunger 9, 10 on the one hand and a shoulder 67, 68 which forms a neck at the mouth of the cylinder 7, 8, on the other hand.

The compensation chamber 29, 30 is situated axially between the guide bushing 11, 13 secured to the head of the plunger 9, 10 and the guide bushing 12, 14 secured to the neck of the mouth of the cylinder 7, 8.

At a first axial end, the compensation chamber 29, 30 is closed in tight manner at each of its axial ends by an O-ring 33, 34 providing tightness against the working chamber 55, 56 and respectively an O-ring 35, 36 providing tightness against the outside.

In the example, the seal 33, 34 is carried by the plunger head between the compensation chamber and the guide bushing 11, 12 and it bears in tight manner against the wall of the cylinder 7, 8. Again in the example, the seal 35, 36 is carried by the neck of the mouth of the cylinder between the compensation chamber and the guide bushing 13, 14 and bears in tight manner against the peripheral wall of the plunger 9, 10.

The compensation chamber has a volume which increases when the jack contracts, and which decreases when the jack is in expansion. The variation in axial length of the compensation chamber is equal in value and opposite in sign to the variation in length of the duct 25, 26.

Since the cannulas have a fixed length, it is the length of the bores 17 and 18 not occupied by the cannulas which varies when the length of the jacks varies. The cross-sectional area of the compensation chamber 29, 30 is equal to the cross-sectional area of the bore 17, 18. Thus, the equal variations in axial length of the duct 25, 26 and the compensation chamber 29, 30 translate into equal variations in their volumes, these variations being opposite in sign, like those of the lengths.

In order to allow the variations in volume of the compensation chamber 29, 30 to compensate for the variations in volume of the duct 25, 26, the compensation chamber 25, 26 communicates with the bore 17, 18 by a radial passage 31, 32 through the plunger 9, 10.

One end of the passage 31, 32 emerges in the compensation chamber 29, 30 in the vicinity of its end closest to the working chamber of the jack, that is, where the compensation chamber is always present even when the jack is in the maximum extended state.

The other end of the radial passage 31, 32 communicates with the bore 17, 18. In the improved example shown, this communication is provided by a constriction which ensures a shock absorbing of the suspension system by braking the flow between the duct 25, 26 and the compensation chamber 29, 30. In the example, the constriction is comprised of the gap or annular play between the cannula and the wall of the bore 17, 18 on the side with the seal 27, 28 where the play communicates with the duct 25, 26.

In a manner not represented, in order to allow the mounting and in particular the insertion of the plunger 9, 10 in the cylinder 7, 8, the plate P3 and the two bases of the jack body where the shoulders 67, 68 and the neck of the mouths of the cylinder are formed can be a single piece attached to the assembly formed by the two plates P1 and P2 and the upper portion of the jack bodies.

The device according to the invention with compensation chamber prevents the displacements of the suspension system from becoming troublesome variations in the feed rate of the hydraulic motor 2 by virtue of variations in the volume of oil present in the feed and return paths. This also allows the volume of oil to remain substantially constant in the circuit without the need for inflow and outflow of oil between the circuit and a reservoir upon each movement of the suspension system.

Seals 33, 34 and 35, 36 are likewise disposed between a cylindrical wall of the outer periphery of the plunger 9, 10 and a cylindrical wall of the inner periphery of the jack cylinder 7, 8 on either side of the compensation chamber 29, 30 so as to ensure tightness of the latter with respect to the outside and with respect to the working chamber 55, 56.

The annular gap between the plunger 9, 10 and the cylinder 7, 8 has in the vicinity of the mouth of the cylinder, on its entire periphery, an end region 72, 73 defined between two seals 35, 36 and 69, 71 carried by the cylinder.

In the example, the two seals are situated on either side of the guide bushing 13, 14 carried by the cylinder.

In the embodiment comprising a single compensation chamber 29, 30 as described above, one of the seals may separate in tight manner said end region 72, 73 and the compensation chamber 29, 30. This seal may then be, as represented, one 35, 36 of the seals closing the compensation chamber.

The two end regions 72 and 73 are connected by a recovery conduit 42 to a leak recovery chamber, in particular, the chamber 41 described above, integrated with the chassis and connected for example to a reservoir of hydraulic fluid.

Thus, the jacks 3, 4 are used in a pair in order to connect the two branches of the hydraulic motor 2, respectively the high pressure and the return branch.

The supplying of the hydraulic motor 2 is accomplished in rigid manner through the cylinder-type suspension system 1, with the possible exception of a rotary seal in the case of a steering wheel.

Figure 4:
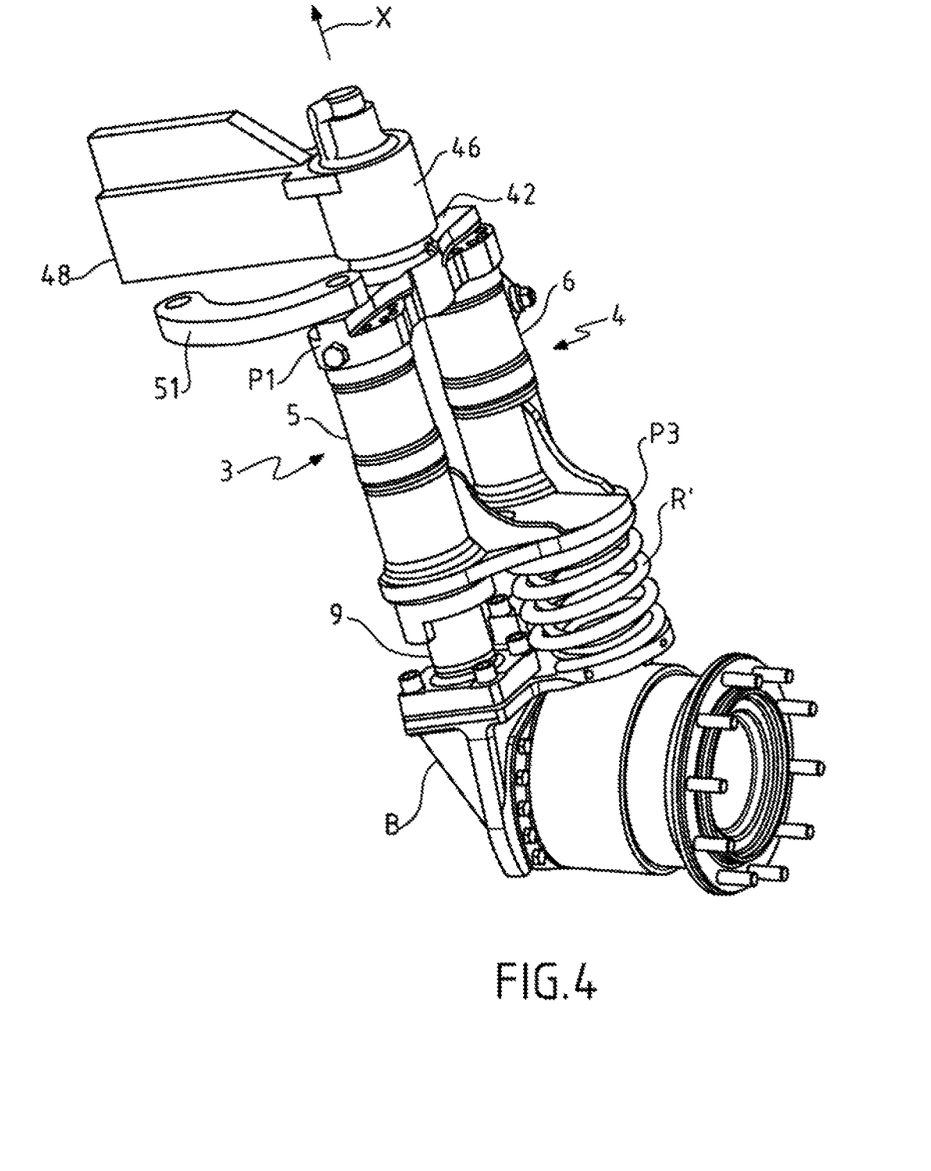
FIG. 4 is a perspective view of a second embodiment of the cylinder-type suspension system.

We shall now describe, in reference to FIG. 4, a second embodiment of a cylinder-type suspension system 1 according to the invention. Only the differences between the first embodiment and the second embodiment shall be described.

The bodies 5, 6 of the telescopic jacks 3, 4 are interconnected in rigid and parallel manner by means of two connecting plates P1, P3.

A compression spring R' is installed functionally between the plate P3, or more generally the bodies 5, 6 of the jacks, and the frame B of the hydraulic motor 2.

For the pivoting of the suspension system about the steering pin axis X, the plate P1 is integrated with a plain bearing 42, of axis X, receiving a trunnion 46, integrated with bracket 48, secured to the chassis C and being a part thereof. The plate P1 comprises a coupling means 51 distant from the steering pin axis X for the connecting of the plate P1 to a steering control linkage.

In this embodiment, the elements whose function is to guide the suspension system in rotation are disposed on top of the plate P1. This arrangement enables a complete pivoting about the axis X of the entire portion of the suspension system situated beneath the plate P1.

Also, the rotation of the suspension system about the axis X is only limited by the disposition of the connecting rod 51. It is thus possible to obtain a suspension system able to pivot between $-90°$ and $+90°$ about the axis X.

This feature allows a vehicle having a suspension system according to this embodiment to better turn in a restricted space.

In the case of motors with two travel directions, the feed duct can become the return duct for rear travel, and the return duct then becomes the feed duct.

The supplying of the motor in the first direction of travel allows the vehicle to be steered in a direction making an angle between $\pm 90°$ in the forward direction. The supplying of the motor in the second direction of travel allows the vehicle to be steered in a direction making an angle between $\pm 90°$ in the rear direction. Thus, the wheel can be driven in all directions.

Figure 5:
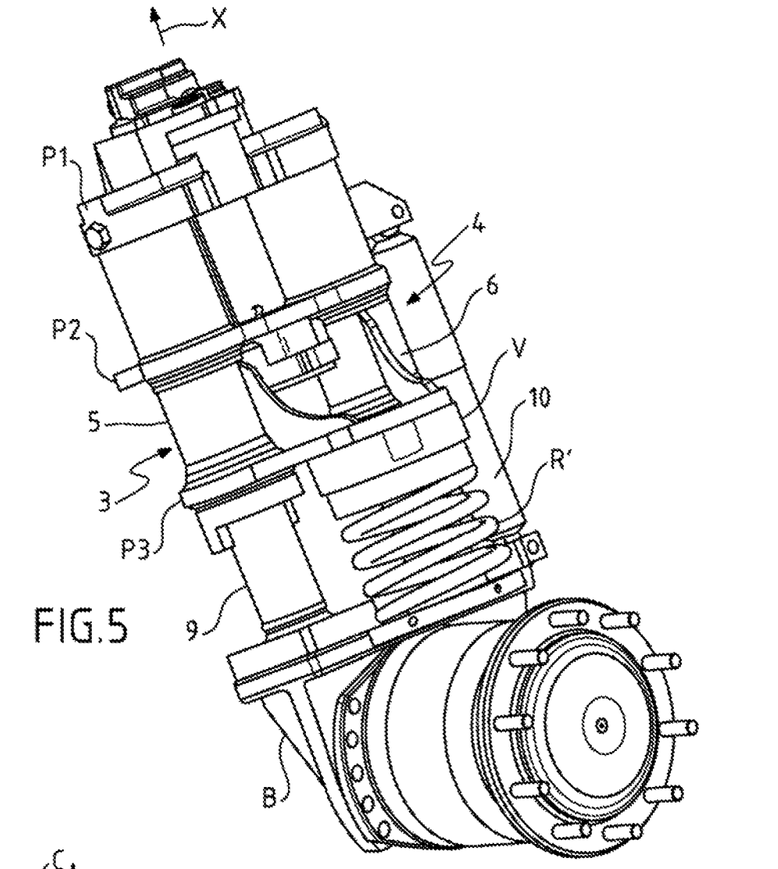
FIG. 5 is a perspective view of a third embodiment of the cylinder-type suspension system.
Figure 6:
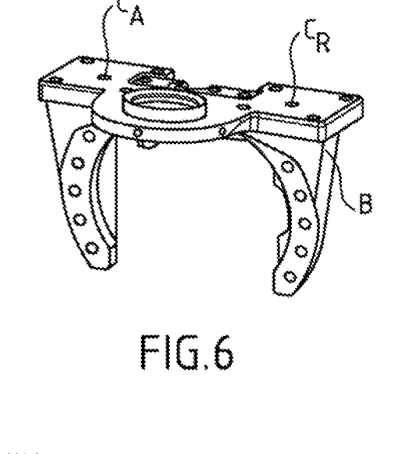
FIG. 6 is a perspective view of an adaptation casting in the example of the cylinder-type suspension system of FIG. 5.
Figure 7:
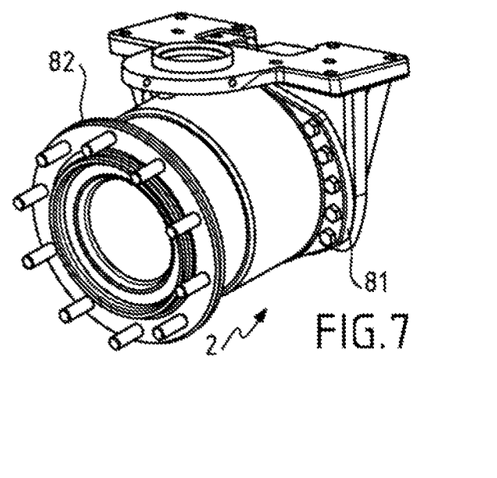
FIG. 7 is a perspective view of the adaptation casting of FIG. 6, equipped with a hydraulic motor in the example of the cylinder-type suspension system of FIG. 5.

We shall now describe in reference to FIG. 5 to 7 a third embodiment of a cylinder-type suspension system 1 according to the invention. Only the differences between the first embodiment and the third embodiment shall be described.

Reference elements which are identical to those described in reference to FIG. 1 are reproduced in FIG. 5. The description of the elements identical to those described in reference to FIG. 1 is not reproduced.

The jack plungers 9 and 10 of the telescopic jacks 3, 4 are interconnected in rigid and parallel manner by means of a connecting plate P4.

A compression spring R' is installed functionally in series with an attitude adjustment jack V between the plate P3, or more generally the bodies 5, 6 of the jacks, and the frame B of the hydraulic motor 2 or the plate P4.

In the embodiment represented, one end of the spring R' is connected to the frame B whereas the other end of the spring R' is connected to a rod of the attitude adjustment jack V, the body of the attitude adjustment jack being connected to the plate P3.

In an embodiment not represented, one end of the spring R' is connected to the plate P3, whereas the other end of the spring R' is connected to a rod of the attitude adjustment jack V, the body of the attitude adjustment jack being connected to the frame B.

The attitude adjustment jack V allows for adjusting the attitude of the vehicle without changing the displacement of the suspension system. The attitude adjustment jack V makes it possible to hold a vehicle cabin level even if the vehicle is moving perpendicularly to a slope.

The attitude adjustment jack V also makes it possible to modify the stiffness of the suspension system.

Advantageously, a control law dedicated to controlling the attitude of the vehicle or the stiffness of the suspension systems defines the fluid volume of the attitude adjustment jack and the pressurization of the suspension jacks.

This control law can be implemented by a control unit, such as a digital computing unit, disposed in the vehicle. The control unit may be connected to means of regulating the fluid volume of the attitude adjustment jack and the pressurization of the suspension jacks.

On the road, one may specify for example an operating mode of the vehicle in which the suspension systems of the vehicle have suspension systems of greater stiffness in the forward as compared to the rear direction. This distribution of stiffness is useful in event of an emergency braking.

For this purpose, it is possible to provide a front suspension system for which the attitude adjustment jack has an empty oil reservoir, whereas the suspension jacks 3, 4 are pressurized. In this case, the stiffness of the front suspension is increased.

It is also possible to provide a rear suspension system for which the attitude adjustment jack has a full oil reservoir, whereas the suspension jacks 3, 4 are not pressurized. In this case, the stiffness of the suspension system is slight.

On the road, one can specify another operating mode of the vehicle, in which the suspension systems of the vehicle are regulated to maintain the attitude of the vehicle.

The cylinder-type suspension system 1 according to this third embodiment furthermore comprises a shock absorber A functionally disposed between the jack bodies 5 and 6 and the plate P4, or more generally the jack plungers 9 and 10. The shock absorber A is parallel with the jacks 3 and 4.

The shock absorber A is disposed laterally with respect to the jack, on the rear side in relation to the direction of travel of the vehicle. Thus, the shock absorber is protected against impacts which might occur on account of the surroundings of the vehicle.

The casting piece B is advantageously provided to be secured to the plate P4.

The plate P4 has two through holes, not represented, one being a feed hole, the other a return hole.

A so called feed conduit Ca is formed in the casting piece B. The feed conduit Ca is advantageously designed to emerge in the area of a feed orifice, feeding the hydraulic motor 2 with pressurized fluid.

A so called return conduit Cr is formed in the casting piece B. The return conduit Cr is advantageously designed to emerge in the area of a return orifice, receiving a nonpressurized fluid from the hydraulic motor 2.

The conduits Ca and Cr are provided to connect the feed path 53 to the pressurized fluid feed of the hydraulic motor 2 and the return path 54 with the return of nonpressurized fluid from the hydraulic motor 2.

Of course, the improvements proposed in the second embodiment could be combined with one or more of the improvements proposed in the third embodiment.

Thus, the problem of rupturing or bursting of a flexible tube of a hydraulic motor is solved.

The invention also has the advantage of not needing free space to be provided for the feed pipes of the hydraulic motor in each portion of the wheel in relation to the chassis of the vehicle.

Of course, the invention is not limited to the examples that have just been described and many modifications can be made to these examples without leaving the scope of the invention. Moreover, the different features, forms, variants and embodiments of the invention can be associated with one another according to different combinations insofar as they are not incompatible or exclusive of each other.

NOMENCLATURE 1 suspension system according to the invention
2 motor
3, 4 jack
5, 6 jack body
7, 8 jack cylinder
9, 10 jack plunger
11, 12 guide bushing
13, 14 guide bushing
15, 16 cavity of the jack body
17, 18 bore in the jack plunger
19, 20 proximal end of the cannula
21, 22 cannula
23, 24 free end of the cannula
25, 26 duct
27, 28 dynamic duct seal
29, 30 compensation chamber
31, 32 passage between the compensation chamber and the duct
33, 34 compensation chamber seal
35, 36 compensation chamber seal
37 central chamber
38 connecting conduit
39 annular chamber
40 connecting conduit
41 annular leak recovery chamber
42 recovery conduit
43 plain bearing
44 plain bearing
46 trunnion
47 trunnion
48 bracket
49 bracket
51 coupling means
52 pump
53 supply path
54 return path
55, 56 working chamber
61, 62, 63 chamber
64, 66 shoulder
67, 68 shoulder
69, 71 seal
72, 73 end region
81 stator
82 rotor
A shock absorber
B hydraulic motor frame
C chassis
Ca, Cr feed and return ducts
E equatorial plane of the wheel
P1, P2, P3, P4 plate
Q point of intersection
R, R' pneumatic spring, mechanical spring
S ground
V attitude adjustment jack
V3, V4 axes of the jack
W wheel
X steering pin axis

The invention claimed is:

1. A method of supplying hydraulic fluid to a hydraulic motor of a drive wheel supporting a vehicle by means of a telescopic cylinder suspension, wherein the hydraulic fluid is made to pass through a feed duct extending longitudinally through a jack of the cylinder suspension system;

wherein the hydraulic fluid having passed through the hydraulic motor is made to pass by a return channel extending longitudinally through a second telescopic jack of the cylinder suspension system, the cylinder suspension system being equipped with two parallel jacks.

2. A cylinder suspension system designed to connect in flexible manner a hydraulic motorization wheel to a vehicle chassis, comprising at least one suspension jack having a body and a plunger, constituting two telescopic elements able to be connected one to the chassis and the other to a wheel stator which can be a wheel support and/or a hydraulic motor frame, and channeling means for connecting a hydraulic pump mounted on the chassis and a hydraulic motor associated with the wheel, wherein the channeling means comprise at least one channel extending longitudinally through the jack;

wherein the at least one channel comprises a feed duct for supplying the hydraulic motor with hydraulic fluid under pressure and one return channel for the hydraulic fluid driven back by the hydraulic motor and returning to the pump; and wherein the suspension has two parallel jacks, each one comprising an aforementioned channel, for supply and for return, respectively.

3. The suspension system as claimed in claim 2, wherein the channel communicates with a chamber for compensation of length variations of the channel, resulting from variations in length of the jack.

4. The suspension system as claimed in claim 3, wherein the compensation chamber has a cross section equal to that of the channel in a region whose length varies with the length of the jack, and in that the compensation chamber has an axial length undergoing variations equal in value and opposite in sign to those of the region of the channel.

5. The suspension system as claimed in claim 3, wherein the compensation chamber is defined between two end walls of this chamber, one of them belonging to a cylinder of the jack and the other to a plunger of the jack, which move away from each other as the jack is shortened.

6. The suspension system as claimed in claim 5, wherein the compensation chamber is annular and it is defined between an interior cylindrical wall formed on the periphery of the plunger and an exterior cylindrical wall formed inside the cylinder of the jack, and in that the channel communicates with the compensation chamber by a substantially radial passage through the plunger.

7. The suspension system as claimed in claim 3, wherein the communication between the channel and the compensation chamber comprises a constriction which contributes to the shock absorbing of the suspension system.

8. The suspension system as claimed in claim 7, wherein, to form the constriction, the passage is partly formed by a gap between a cannula and a bore.

9. The suspension system as claimed in claim 2, wherein the channel is partly defined in a bore of a jack plunger and partly in an axial cannula which is secured to the body of the jack in a cylinder of the jack, in that the cannula slides in the bore of the plunger during the displacements of the suspension system, and in that a seal is provided around the cannula in the bore of the plunger.

10. The suspension system as claimed in claim 2, wherein on the side with the chassis, the channel is connected to a chamber which is concentric with a steering pin.

11. The suspension system as claimed in claim 10, wherein there are two chambers, one for the supplying of hydraulic fluid under pressure, the other for the return of hydraulic fluid, one being central, the other being annular about the central chamber.

12. The suspension system as claimed in claim 10, wherein there is also a leak recovery chamber in the steering pin, designed to intercept hydraulic fluid leakage in the steering pin and/or connected to a channel for recovery of hydraulic fluid leakages coming from the mouth of the cylinder.

13. The suspension system as claimed in claim 2, wherein the suspension medium located in the working chamber of the jack between the plunger and a bottom of the cylinder of the jack is not miscible with the hydraulic fluid supplying the hydraulic motor.

14. The suspension system as claimed in claim 2, wherein the telescopic elements are adapted to be connected, the one rigidly to the wheel stator, and the other to the chassis of the vehicle with at most one degree of freedom, which is a rotation about a steering pin axis, and in that the jack ensures a linear guidance of the wheel stator with respect to the chassis during displacement movements of the suspension system.

15. The suspension system as claimed in claim 14, wherein the longitudinal axis of the jack meets an equatorial plane of the wheel substantially in the area of the ground.

16. The suspension system as claimed in claim 2, comprising furthermore a spring functionally disposed between a jack body and the frame of the hydraulic motor.

17. The suspension system as claimed in claim 2, furthermore comprising an assembly containing a spring and an attitude adjustment jack, mounted in series, said assembly being functionally disposed between the jack body and the frame of the hydraulic motor.

18. An adaptation casting designed to integrate a hydraulic motor with a suspension system as claimed in claim 2 and to place in respective communication the fluid feed and return ducts of the suspension system with those of the hydraulic motor.

19. A vehicle mounted on wheels with hydraulic motorization, wherein the hydraulic motorization wheels are equipped with a suspension system as claimed in claim 2.

* * * * *